(12) United States Patent
Boutaghou

(10) Patent No.: US 6,674,609 B2
(45) Date of Patent: Jan. 6, 2004

(54) ANECHOIC CHAMBER NOISE REDUCTION FOR A DISC DRIVE

(75) Inventor: Zine Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 108 days.

(21) Appl. No.: 09/822,816

(22) Filed: Mar. 30, 2001

(65) Prior Publication Data

US 2001/0048571 A1 Dec. 6, 2001

Related U.S. Application Data

(60) Provisional application No. 60/193,211, filed on Mar. 30, 2000.

(51) Int. Cl.[7] .............................................. G11B 33/14
(52) U.S. Cl. ................................................. 360/97.02
(58) Field of Search ......................... 360/97.02, 97.03, 360/97.04; 181/198, 284, 293; 206/523, 524, 524.1, 524.3, 524.6

(56) References Cited

U.S. PATENT DOCUMENTS

| | | | | |
|---|---|---|---|---|
| 3,527,969 A | * | 9/1970 | Papst | 310/51 |
| 4,491,888 A | * | 1/1985 | Brown et al. | 360/97.03 |
| 4,971,850 A | * | 11/1990 | Kuan-Hong | 428/137 |
| 5,214,549 A | * | 5/1993 | Baker et al. | 360/97.02 |
| 5,260,513 A | | 11/1993 | Giles et al. | 174/35 MS |
| 5,282,100 A | | 1/1994 | Tacklind et al. | 360/97.02 |
| 5,331,567 A | * | 7/1994 | Gibbons et al. | 703/1 |
| 5,492,749 A | * | 2/1996 | Solves et al. | 428/172 |
| 5,510,954 A | | 4/1996 | Wyler | 361/685 |
| 5,596,483 A | | 1/1997 | Wyler | 361/683 |
| 5,598,306 A | | 1/1997 | Frees et al. | 360/97.02 |
| 5,658,656 A | | 8/1997 | Whitney et al. | 428/304.4 |
| 5,666,239 A | * | 9/1997 | Pottebaum | 360/97.03 |
| 5,691,037 A | * | 11/1997 | McCutcheon et al. | 428/172 |
| 5,781,373 A | | 7/1998 | Larson et al. | 360/97.02 |
| 6,005,768 A | | 12/1999 | Jo | 361/685 |
| 6,104,608 A | | 8/2000 | Cassinelli et al. | 361/692 |
| 6,469,864 B2 | * | 10/2002 | Kamezawa et al. | 360/97.01 |

* cited by examiner

Primary Examiner—David Davis
(74) Attorney, Agent, or Firm—Jennifer Buenzow

(57) ABSTRACT

A disc drive system includes a base plate, a spindle attached to the base plate, and at least one disc attached to the spindle. A cover is also included for attaching to the base plate. The cover and the base plate form a disc enclosure which encloses the at least one disc, a portion of the spindle, and the actuator assembly. The disc drive system also includes a mechanism for attenuating acoustical emissions produced by the spindle, the at least one disc, and the actuator assembly. The mechanism includes anechoic features formed on the interior of the disc enclosure, using a liner formed with the anechoic features or having the anechoic features formed integral on one or both of the cover and base plate.

20 Claims, 5 Drawing Sheets

ANECHOIC CHAMBER NOISE REDUCTION FOR A DISC DRIVE

RELATED APPLICATIONS

This application claims the benefit under 35 U.S.C. 119(e) of U.S. Provisional Application Ser. No. 60/193,211 filed Mar. 30, 2000.

FIELD OF THE INVENTION

The present invention relates to the field of mass-storage devices. More particularly, this invention relates to a method and apparatus for reducing acoustic noise from disc drives.

BACKGROUND OF THE INVENTION

Devices that store data are key components of any computer system. Computer systems have many different devices where data can be stored. One common device for storing massive amounts of computer data is a disc drive. The basic parts of a disc drive are a disc assembly having at least one disc that is rotated, an actuator that moves a transducer to various locations over the rotating disc, and circuitry that is used to write and/or read data to and from the disc via the transducer. The disc drive also includes circuitry for encoding data so that it can be successfully retrieved from and written to the disc surface. A microprocessor controls most of the operations of the disc drive, in addition to passing the data back to the requesting computer and taking data from a requesting computer for storing to the disc.

The disc drive includes a transducer head for writing data onto circular or spiral tracks in a magnetic layer the disc surfaces and for reading the data from the magnetic layer. In some drives, the transducer includes an electrically driven coil (or "write head") that provides a magnetic field for writing data, and a magneto-resistive (MR) element (or "read head") that detects changes in the magnetic field along the tracks for reading data.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc-drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

When the disc assembly is rotated at high speed, the air adjacent to the spinning disc or discs is caused to move as well. This moving air moves between the rotating disc and the read/write transducer, creating an air bearing, and advantageously causing the transducer to "fly" over the disc surface.

An operating disc drive can emit relatively large amounts of acoustic noise generated by vibrations of the disc drive cover caused by the spinning motions of the spindle and seek and track following motions of the actuator. The spindle and actuator movements create forces that act on the structure of the disc drive. These forces eventually find a path to the device enclosure. When the forces reach the device enclosure, the forces are converted into displacements which in turn create pressure waves in the surrounding air which are perceived as acoustic noise to the human ear.

The actuator assembly moves in response to energizing a voice coil motor to move the actuator assembly about a pivot axis, thereby swinging each of the arms associated with the actuator assembly, the load springs, and associated read/write head over the associated disc surface. When moved in this manner during normal operation, the assembled load springs and associated read/write head tend to vibrate at some frequencies. The spindle motor, and rapidly spinning the discs, contribute additional vibration. Vibration from the spindle motor and voice coil motor actions may be transmitted to the disc drive housing through the pivot and spindle journals. The resulting vibration in the housing causes radiation of acoustic noise, especially from the cover. Such acoustic noise may be annoying and may suggest poor quality to the user.

The device enclosure actually acts like a speaker for the internal forces created by the spindle and actuator movement. The dynamics of the device enclosure, such as the natural modes of vibration, act as mechanical amplifiers for the forces generated inside the drive. It has been found that the shape of the acoustic spectrum in the frequency domain is similar to the shape of the mechanical transfer function of the device enclosure. If it were possible to make the device enclosure infinitely stiff then no displacements could be created that would be manifested as acoustic noise.

In addition to being annoying and possibly suggesting poor quality to the user, high acoustic emissions from disc drives tend to reduce the comfort level for a particular computing environment. As a result, acoustic noise emanating from a disc drive is a critical performance factor that is usually tightly specified to be below a maximum level. As part of the quality assurances practices when manufacturing disc drives, the drives are tested in an acoustic tester to determine the amount of noise emanating from the device. Drives that emit noise above a maximum threshold need to be re-worked to be in compliance with the requirements.

Government agencies throughout the world are now requiring that the decibel level of average sound energy emanating from office equipment be substantially reduced. Computer manufacturers are also placing acoustic emission standards on disc drive manufacturers. Manufacturers of disc drives have also long recognized that certain improvements for data storage performance in disc drives, namely, to increase disc rotation velocity and to increase head actuator movement frequency, contribute to unwanted acoustic noise. There is a marked decrease in human sensitivity to acoustic noise below about 200 Hz and above about 6000 Hz. Thus, it is clearly advantageous to attenuate acoustic noise radiated from disc drives in the frequency range from about 200 Hz to about 4000 Hz.

Several methods to reduce the intensity of unwanted acoustic noise have been attempted. Among the several methods are the use of external dampening techniques for the entire disc drive. For example, mechanically isolating the cover of a disc drive from the mechanical reinforcement structure with a continuous airspace. Many designers believe that most of the unwanted acoustic frequencies emanate from a "drum-like" top cover and from the base plate of the disc drive. Some designers have made strides in addressing the acoustic frequencies that escape from the top cover. The designers use cover dampeners and adhesives with inherent dampening properties on the cover. Other designers have attempted to completely surround the exterior of the disc drive with sound deadening material. Still other designers have attempted to completely isolate the spindle from the base in order to reduce the unwanted acoustic emissions at multiple frequencies. Such spindle isolation conventionally includes indirect attachment of the spindle to the base. Many environments where disc drives are used are sensitive to the amount of acoustic emissions (or noise) coming from an operating disc drive.

Disc drives are now being contemplated for use in home entertainment applications. Use of disc drives is now contemplated for video and television. One application of disc drives includes adding them to home set top boxes. Still others use disc drives to capture images from television for replay at a later time. One such system is the TiVo System from Phillips Corporation. Users in the home entertainment area are especially sensitive to acoustic noise, since noises seem more pronounced during quiet scenes of a movie or when background music is softly played.

Therefore, it is desirable to reduce such acoustic noise. What is also needed is a simple solution that is not prohibitively costly and which introduces few, if any, new parts to the disc drive. What is needed is a method and apparatus to substantially reduce unwanted acoustic emissions at or near the spindle. Also needed is an inexpensive method and apparatus which only slightly increases the complexity of the manufacturing processes needed to manufacture the drive. The solution also must not increase the size of the disc drive system. Clearly, there is a need for a solution to reduce or eliminate the vibration energy transferred to the cover and housing from the voice coil and spindle motors. There is also need for a solution which minimizes re-working of disc drives.

SUMMARY OF THE INVENTION

A disc drive includes a base plate and a spindle attached to the base plate. In addition, at least one disc is attached to the spindle and the spindle is adapted to rotate with respect to the base plate. The disc drive also includes a cover for attaching to the base plate. The cover and the base plate form a disc enclosure which encloses the at least one disc and a portion of the spindle. The disc enclosure has an interior and an exterior. At least a portion of the interior surface of the disc enclosure is provided with anechoic features. In one embodiment, the anechoic features are formed integral to the cover and are covered with a energy-absorbing material. In another embodiment, the anechoic features are formed integral to the base plate and are covered with a energy-absorbing material. In another embodiment, the anechoic features are formed integral to both the base plate and to the cover and each is covered with a energy-absorbing material.

In still another embodiment, the anechoic features are formed on a liner which is attached to at least a portion of the interior surface of the disc enclosure. The liner is formed from an energy-absorbing material and attached to the interior surface of the cover, or to the interior surface of the base plate, or to both the cover and base plate. The liner portions are attached to at least a portion of the interior surface of the disc enclosure. The anechoic features are formed to attenuate a selected range of frequencies. In some embodiments, the anechoic features are V-shaped rows while in other embodiments the anechoic features are spike-shaped. The V-shaped rows may be orientated in different directions on the interior surface of the disc enclosure.

A method for substantially reducing vibrations from a disc drive system having a base plate and a cover which form a disc enclosure having an interior surface and an exterior surface includes the steps of providing anechoic features on the base plate corresponding to the interior surface of the disc enclosure, and providing anechoic features on the cover corresponding to the interior surface of the disc enclosure. One embodiment of the method may further include the steps of forming a liner member for the base plate of a disc drive, attaching the liner member to the base plate, forming a liner member for the cover of a disc drive, and attaching the liner member to the cover. Another embodiment of the method may further include the steps of forming the base plate of a disc drive with anechoic features therein and placing an energy-absorbing material on the base plate, and forming the cover of a disc drive with anechoic features therein, and placing an energy-absorbing material on the cover.

DESCRIPTION OF THE PREFERRED EMBODIMENT

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

The invention described in this application is useful for all types of disc drives, including hard-disc drives, ZIP drives, floppy-disc drives, and any other type of drives, systems of drives (such as a "redundant array of inexpensive/ independent disc drives," or RAID, configuration) or other devices, where a disc assembly is rotated within a housing.

Figure 1:
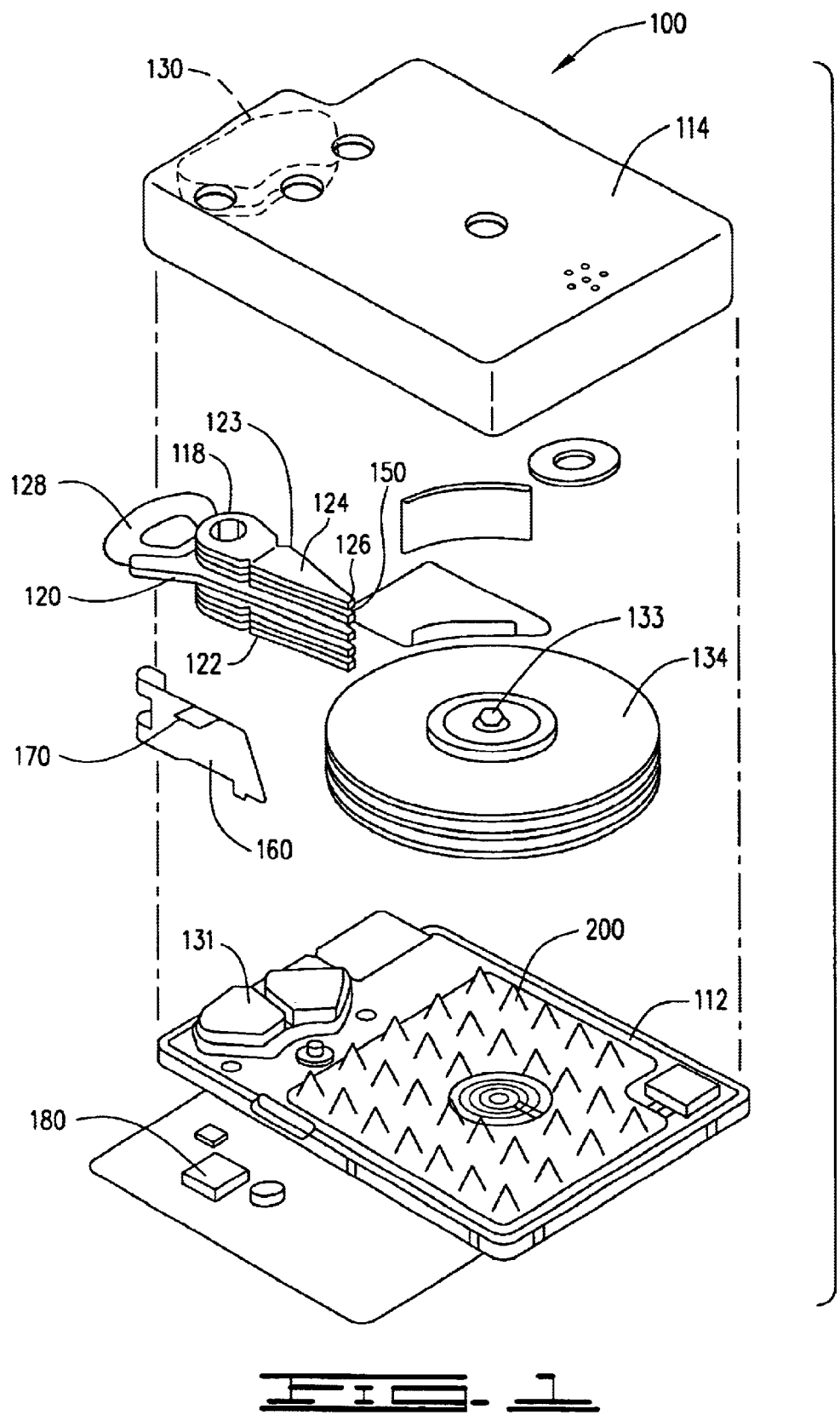
FIG. 1 is an exploded view of a disc drive with a multiple disc stack and a ramp assembly for loading and unloading transducers to and from the surfaces of the discs.

The invention described in this application is useful with many electrical and mechanical configurations of disc drives having either rotary or linear actuation. In addition, the invention is also useful in all types of disc drives including hard disc drives, zip drives, floppy disc drives and any other type of drives where providing a low-noise current source for the transducer may be desirable. FIG. 1 is an exploded view of one embodiment of the present invention, this embodiment showing one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. In some embodiments, transducer 150 includes a electromagnetic coil write head and a magneto-resistive read head. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called spindle hub 133. In this particular disc drive, the spindle motor is within hub 133. In FIG. 1, a number of discs 134 (one or more; four are shown) are attached to the spindle hub 133 to form disc assembly 132. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub. The base 112 includes a multiplicity of acoustic dampening features or anechoic features 200 which reduce the emitted noise from the disc drive 100. The anechoic features 200 shown are a plurality of spikes having the capability of attenuating emitted noise from the various components of the disc drive 100.

Figure 2:
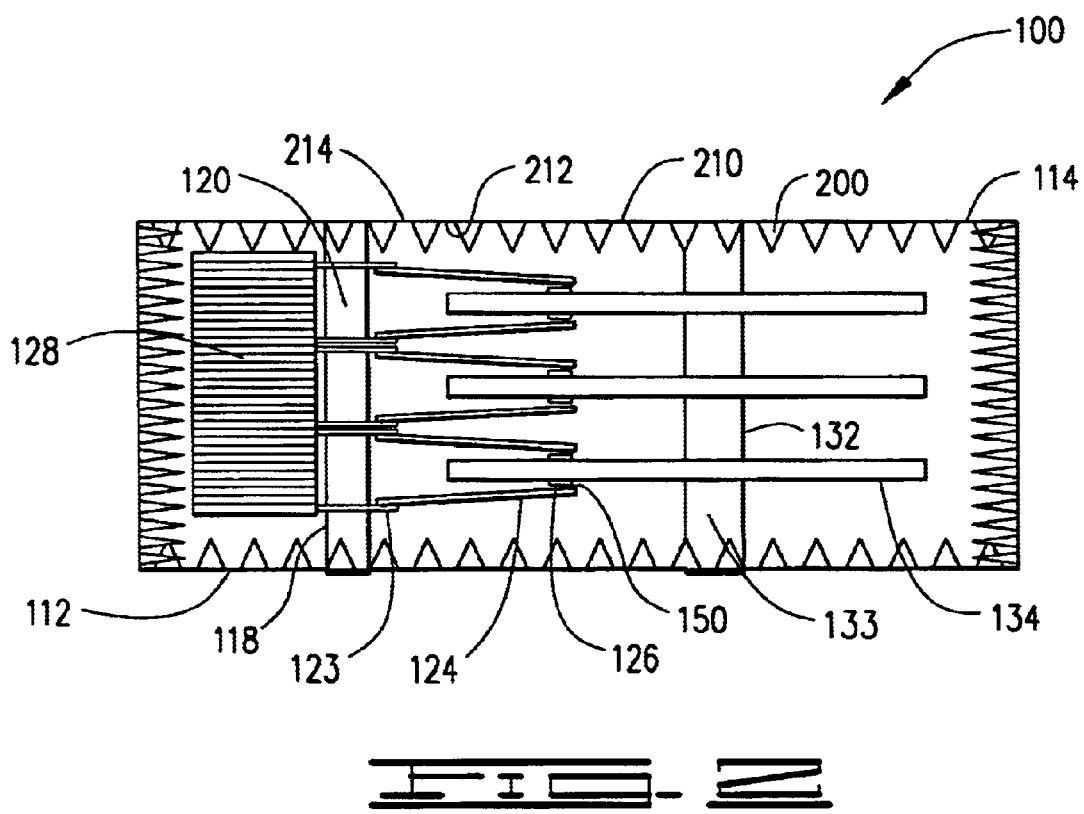
FIG. 2 is a cut away view of an assembled disc drive incorporating the acoustic dampening feature of the present invention.

FIG. 2 is a cut-away view of an assembled disc drive 100 incorporating the acoustic dampening feature or anechoic features 200 of the present invention. The disc drive shown in FIG. 2 shows the cover 114 as attached to the base 112 to form a disc enclosure 210. The disc enclosure 210 has an interior surface 212 and an exterior surface 214. The disc enclosure encloses substantial portions of the actuator shaft, the spindle shaft, the spindle hub 133, the discs 134, the load beams or load springs 124, the actuator assembly 120 with its plurality of arms 123, the slider 126, and the transducer 150. In short, the disc enclosure 210 forms a sealed environment which includes major portions of many of the disc drive components. The anechoic features 200 are formed on the interior surface 212 of the disc enclosure 210. As shown in FIG. 2, the anechoic features 200 are a multiplicity of spikes which are formed on the interior surface of the cover 114 and another plurality of spikes formed on the interior surface of the base 112. It should be noted that the spacing between the anechoic features 200 can be changed to attenuate a particular frequency emanating from the disc drive 100. Furthermore, the sharpness of the anechoic features or the angle that they make with respect to the exterior surface of the disc enclosure 210 and with respect to one another can be changed also to attenuate particular frequencies emanating from the disc drive 100. The anechoic features 200 can be formed within the cover 114 and within the base 112 when the base and cover are manufactured. For example, the base 112 may be cast with anechoic features 200 cast therein. Similarly, a cover 114 can be cast or more likely stamped with the anechoic features 200 stamped therein. The anechoic features 200 shown in the figures are enlarged to easily show the various anechoic features. It should be noted that smaller anechoic features 200 may be employed and that the angles of each cone or spike of the anechoic feature 200 can be changed to attenuate selected frequencies and prevent those from emanating from the disc drive 100.

Figure 3:
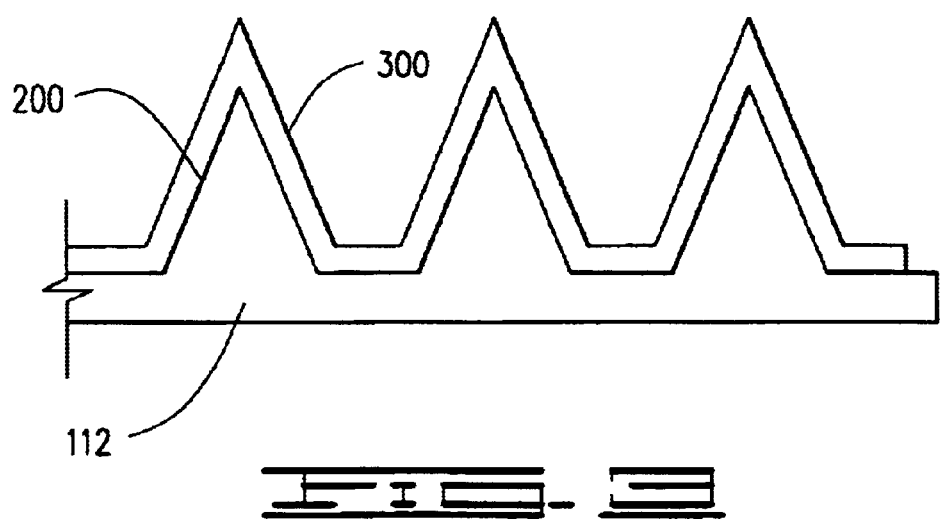
FIG. 3 is an isometric view of a portion of the anechoic features associated with one embodiment of the invention.

FIG. 3 is an isometric view of a portion of the anechoic features 200 associated with one embodiment of the invention. The anechoic features 200 are cones or spikes which are cast into a base plate 112 or cast or stamped into the cover 114. As shown in FIG. 3, the anechoic features 200 are cast into a base plate 112. The anechoic features 200 in this particular embodiment are covered with an energy-absorbing material 300 such as commonly available foam rubber. The energy absorbing material absorbs acoustical energy or sound which is emanating from the disc drive 100. It should be noted that the energy-absorbing material 300 can be applied in various thicknesses. Typically the energy-absorbing material 300 is applied by any number of means, such as using an adhesive. The energy-absorbing material could also be sputtered onto a base plate 112 casting or could be sputtered onto the cover 114. The energy-absorbing material 300 is selected so that out-gassing is minimized. Minimizing out-gassing also minimizes problems of long organic molecules unintentionally becoming attached to lubricants which are placed on the surface of the disc or discs 134.

Figure 4:
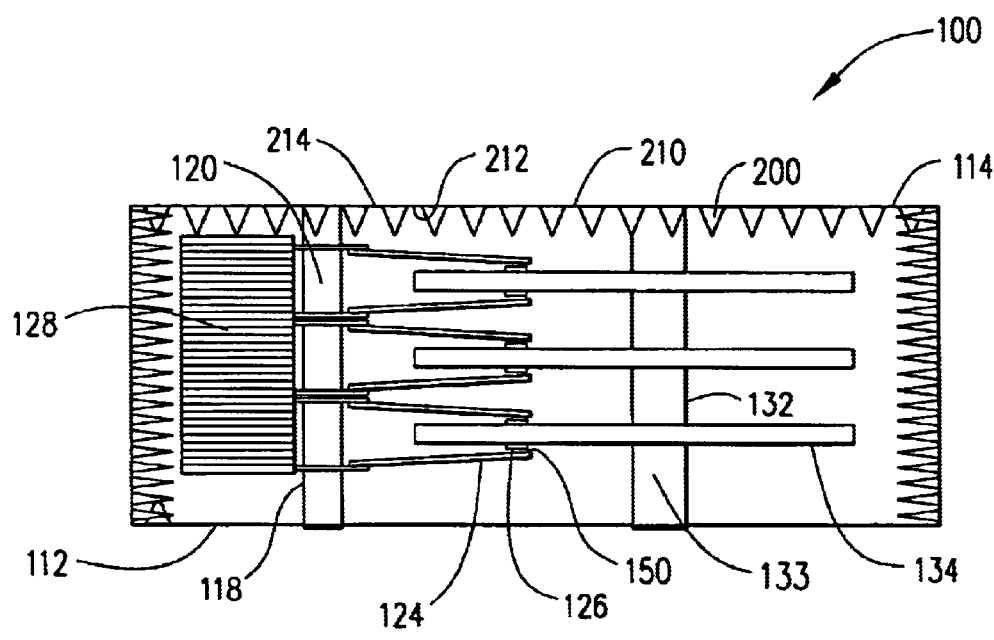
FIG. 4 is a cut away view of an assembled disc drive incorporating the acoustic dampening feature of the present invention in the cover.

FIG. 4 is a cut-away view of an assembled disc drive incorporating the acoustic dampening feature of the present invention on the cover 112. Once again the base 112 and the cover 114 form a disc enclosure 210 having an interior surface 212 and an exterior surface 214. In this particular embodiment the anechoic features 200 are produced only on the cover 114. The anechoic features in this particular embodiment are formed in the same way as the anechoic features 200 formed in the discussions of FIGS. 2 and 3. It should be noted that the anechoic features 200 cover most of the interior surface of the cover 114. However, in another embodiment only portions of the interior surface 212 of the disc enclosure and specifically of the interior surface associated with the cover 114 need be provided with the anechoic features 200. For example, there may be cut-outs for the spindle shaft or the actuator shaft 118. There also may be spaces which are not covered by anechoic features 200 which are selected in order to optimize attenuation of the acoustic energy or noise emanating from the disc drive 100.

Figure 5:
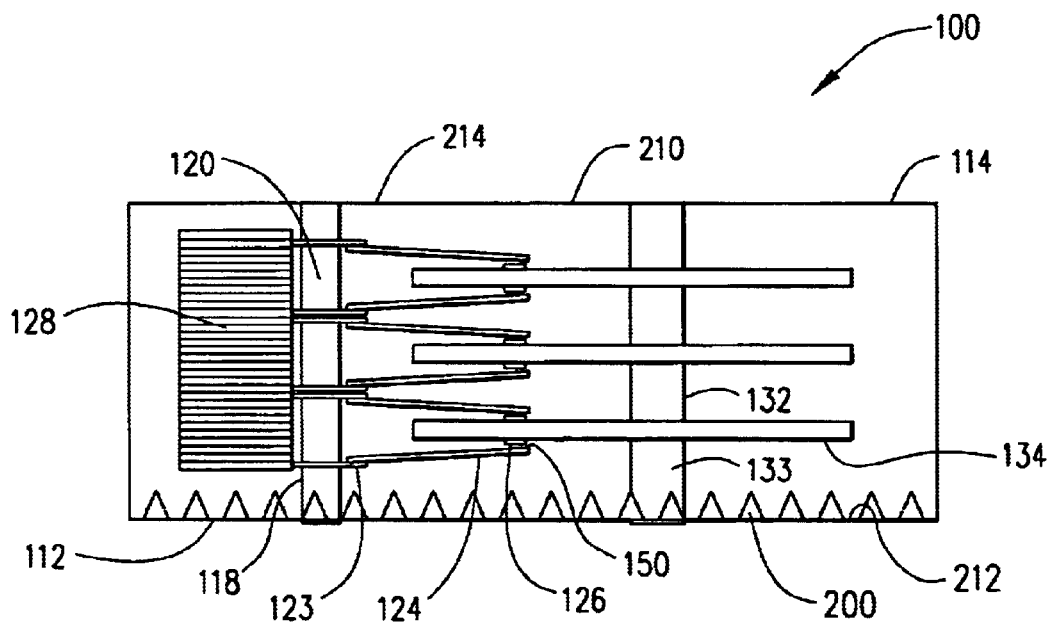
FIG. 5 is a cut away view of an assembled disc drive incorporating the acoustic dampening feature of the present invention in the base plate.

FIG. 5 is a cut-away view of an assembled disc drive 100 incorporating the acoustic dampening feature of the present invention in the base plate 112. Again the anechoic features are formed in the same way as discussed with respect to FIGS. 2 and 3 in the various embodiments. In addition the anechoic features may be provided across the entire base plate or may be selectively removed from portions of the base plate either to accommodate certain features of the disc drive, or certain components of the disc drive, such as the actuator shaft 118 or the spindle shaft. In addition, the anechoic features 200 may be left out of certain regions of the base plate 112 in order to attenuate certain frequencies of acoustic energy or noise which emanate from the disc drive 100. It should be noted also that in FIGS. 1, 2, 3, 4 and 5, the anechoic features 200, or spikes, have been shown as equally spaced or uniformly distributed about the interior surface 212 of the disc enclosure. In other embodiments, the anechoic features may be non-uniformly distributed or unevenly spaced on either the cover 114 or on the base 112 or on both.

Figure 6:
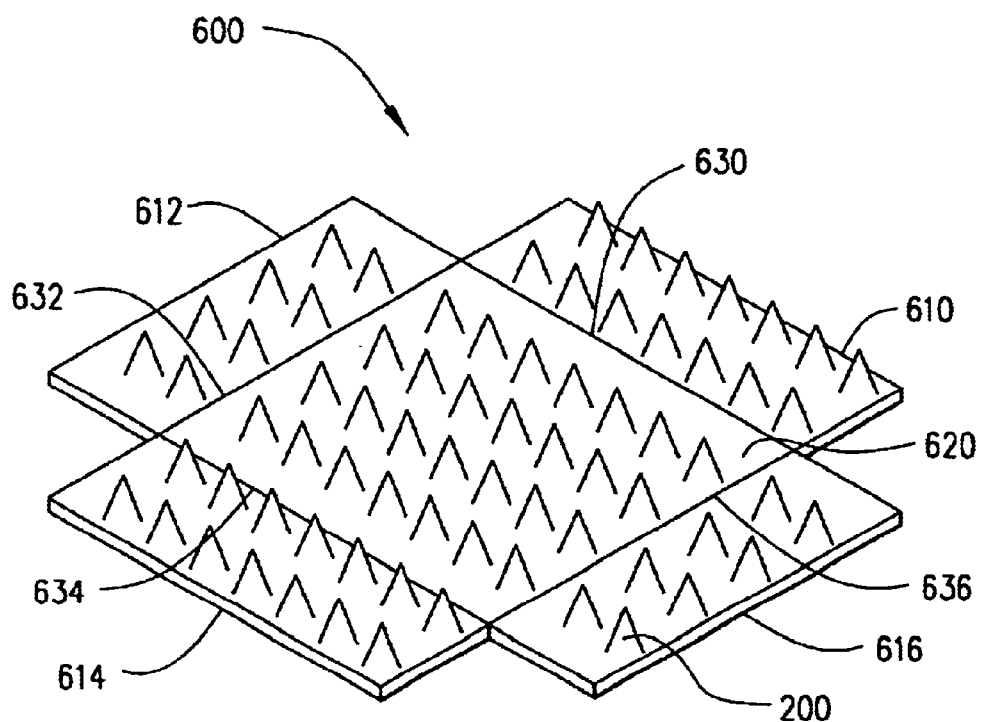
FIG. 6 is an isometric view of a cover liner incorporating the acoustic dampening feature of the present invention.
Figure 7:
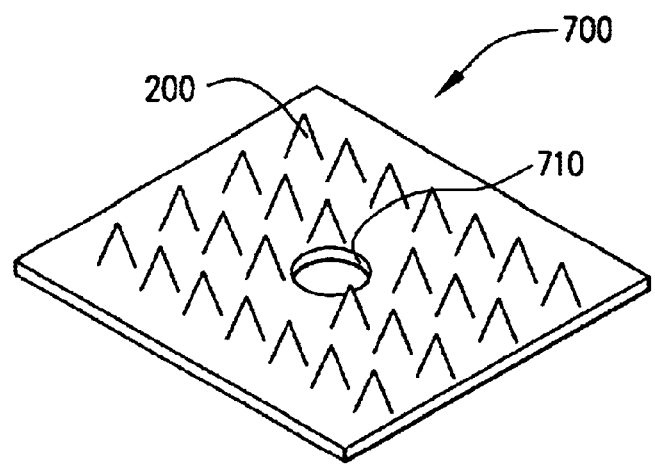
FIG. 7 is an isometric view of a base plate liner incorporating the acoustic dampening feature of the present invention.

FIGS. 6 and 7 are isometric views of another embodiment of this invention. Rather than stamp or cast the anechoic features 200 into either the cover 114 or the base plate 112, a set of liners which include anechoic features 200 are formed. FIG. 6 shows a liner 600 for the cover 114. The liner 600 includes anechoic features 200 which are a multiplicity of spikes. The anechoic features are molded from a polymer material in the form of a liner 600, 700. The liner 600, 700 is then attached to the cover 114 or base plate 112, respectively. As shown in FIG. 6, the liner 600 includes flaps 610, 612, 614 and 616, which are attached to the main portion 620 of the liner by folds or living hinges 630, 632, 634, 636. The flaps 610, 612, 614 and 616 are used to cover the side walls of the cover 114. It should be noted that the liner for the cover need not have the flaps. In some designs of disc drives, the base includes the sidewalls and the cover is a flat surface. In addition it should be noted that the liner 600 is fully populated with anechoic features 200 as shown in FIG. 6. However there may be instances where certain cut-outs or anechoic features would be removed or the spacing between the anechoic features would be changed in order to attenuate selected frequencies from emanating within the disc drive 100. The insert 700 is a flat sheet which includes anechoic features 200 and has an opening 710 therein to accommodate the spindle hub 133 and spindle shaft. Other openings could be placed within the liner 700. The liners are typically made from a polymer. The anechoic features 200 are molded on the polymer and then attached to the base 112 or cover 114 or both. Coatings can then be applied to the anechoic features 200 to prevent out-gassing or to further improve sound isolation from the disc drive 100. It should also be noted that rather than having two liners or specifically having a liner 600 with flaps 610, 612, 614 and 616, an alternative embodiment would be to produce two flat sheets and then have one or more flat sheets used to cover the side walls of either the base 112 or the cover 114. It should be noted that the liners are attached in various ways and can be attached with viscoelastic adhesive to further dampen acoustic noise emanating from the disc drive 100. Furthermore, it is contemplated that the anechoic features could be provided on a material of sound-absorbing or energy-absorbing material and that these could merely be stamped or cut out and placed on the respective surfaces on the interior 212 of the disc enclosure. If such a material were stamped or cut out of such a material, the material could be provided with an adhesive as well as a backing that could merely be peeled off so that the liners or various configurations of the material could be placed on the base 112 on the cover 114 and on the sidewalls of the cover or base. Of course in some embodiments it may only be necessary to cover the base by itself, or the cover by itself or just portions of both by themselves.

Figure 8:
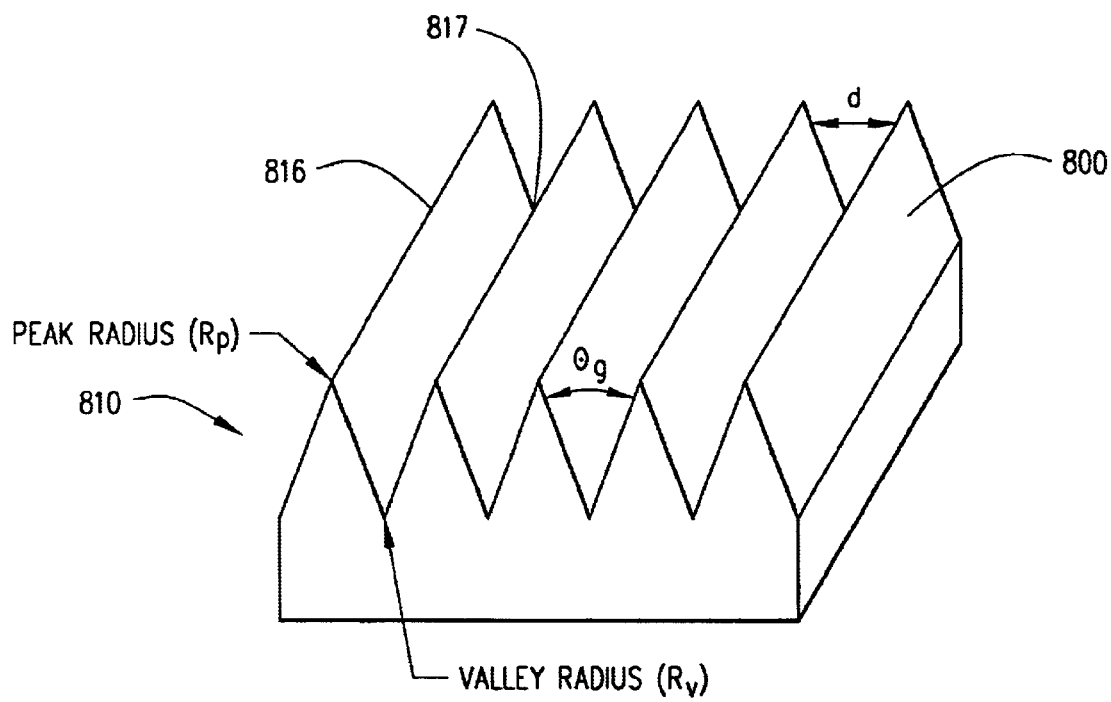
FIG. 8 is an isometric view of a portion of the anechoic features associated with another embodiment of the invention.

FIG. 8 is an isometric view of a portion of a liner or a portion of either the base 112 or the cover 114 which have anechoic features 800. FIG. 8 depicts that the anechoic features need not necessarily be cones or pyramidal in shape and that in fact they could be rows of wedges which would be used to form a radiation- or energy-absorbing structure 810. The energy-absorbing structure 810 would be made from a silicon-based elastomer and include a plurality of wedges or anechoic features 800. Each wedge 800 has a groove angle $\theta_g$ with radii $R_p$ and $R_v$. Acoustic energy instant to the wedges would be subject to reflection which effectuates absorption of the acoustic energy. The angle $\theta_g$ as well as the radius of the peak $R_p$ and the valley radius $R_v$ could be changed to optimize the sound-absorbing or acoustic energy-absorbing qualities of the energy-absorbing structure 810. Each wedge 800 includes a peak 816. Between each of the wedges 800 is a valley 817. It should be noted that the wedges can be placed in any orientation within the disc drive enclosure 210 to attenuate acoustic energy which would otherwise emanate from the disc drive 100.

Figure 9:
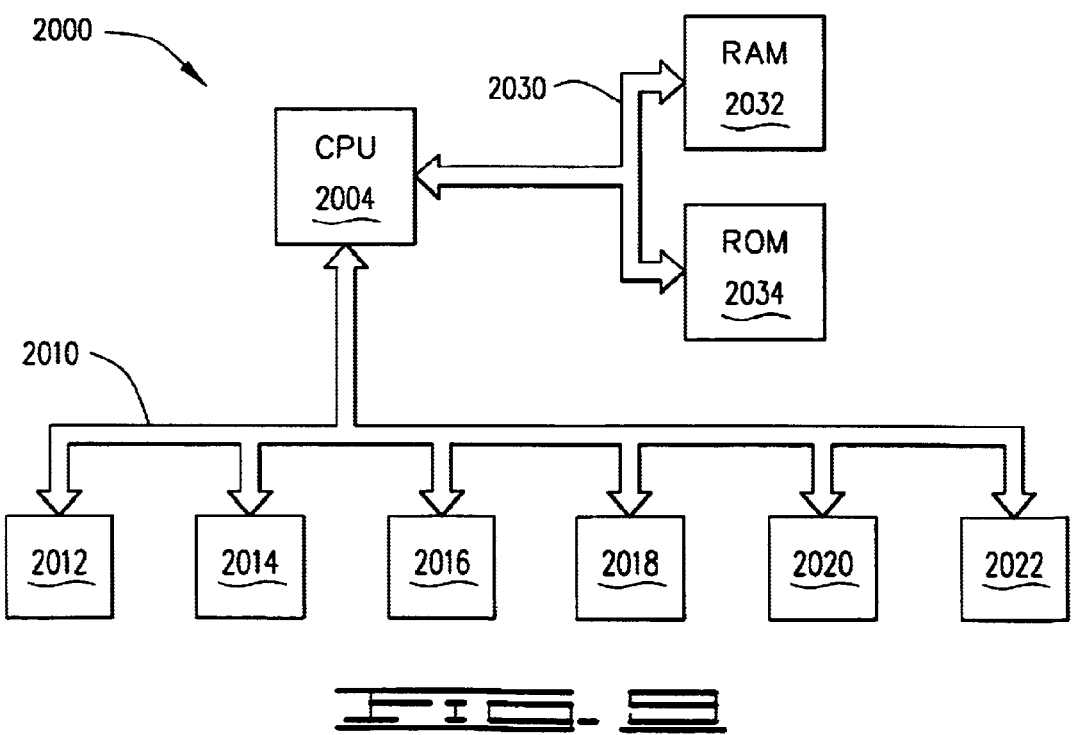
FIG. 9 is a diagram of an information handling system.

FIG. 9 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

CONCLUSION

Described above is a method and apparatus for isolating actuator noise in a disc-drive system. One embodiment provides a disc drive 100 having a rotary actuator. The disc drive includes a base 112 and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. At the far end of the separate arms 123 is a magnetic transducer 150. In some embodiments, transducer 150 includes a write head and a magneto-resistive read head.

A disc drive 100 includes a base plate 112 and a spindle 133 attached to the base plate 112. In addition, at least one disc 134 is attached to the spindle 133 and the spindle 133 is adapted to rotate with respect to the base plate 112. The disc drive also includes a cover 114 for attaching to the base plate 112. The cover 114 and the base plate 112 form a disc enclosure 210 which encloses the at least one disc 134 and a portion of the spindle 133. The disc enclosure 210 has an interior 212 and an exterior 214. At least a portion of the interior surface 212 of the disc enclosure 210 is provided with anechoic features 200, 800. In one embodiment, the anechoic features 200, 800 are formed integral to the cover 114 and are covered with an energy-absorbing material 300. In another embodiment, the anechoic features 200, 800 are formed integral to the base plate 112 and are covered with an energy-absorbing material 300. In another embodiment, the anechoic features 200, 800 are formed integral to both the base plate 112 and to the cover 114 and each is covered with a energy-absorbing material 300.

In still another embodiment, the anechoic features 200, 800 are formed on a liner 600, 700 which is attached to at least a portion of the interior surface 212 of the disc enclosure 210. The liner 600, 700 is formed from an energy-absorbing material 300 and attached to the interior surface 212 of the cover 114, or to the interior surface 212 of the base plate 112, or to both the cover 114 and base plate 112. The liner portions 600, 700 are attached to at least a portion of the interior surface 212 of the disc enclosure 210. The anechoic features 200, 800 are formed to attenuate a selected range of frequencies. In some embodiments, the anechoic features 800 are V-shaped rows while in other embodiments the anechoic features 200 are spike-shaped. The V-shaped rows 800 may be orientated in different directions on the interior surface 212 of the disc enclosure 210.

A method for substantially reducing vibrations from a disc drive system 100 having a base plate 112 and a cover 114 which form a disc enclosure 210 having an interior surface 212 and an exterior surface 214 includes the steps of providing anechoic features 200, 800 on the base plate 112 corresponding to the interior surface 212 of the disc enclosure 210, and providing anechoic features 200, 800 on the cover 114 corresponding to the interior surface 212 of the disc enclosure 210. One embodiment of the method may further include the steps of forming a liner member 600, 700 for the base plate 112 of a disc drive 100, attaching the liner member 600, 700 to the base plate 112, forming a liner member 600, 700 for the cover 114 of a disc drive 100, and attaching the liner member 600, 700 to the cover 114. Another embodiment of the method may further include the steps of forming the base plate 112 of a disc drive 100 with anechoic features 200, 800 therein and placing an energy-absorbing material 300 on the base plate 112, and forming the cover 114 of a disc drive 100 with anechoic features 200, 800 therein, and placing an energy-absorbing material 300 on the cover 114.

Most generally, a disc drive system 100 includes a base plate 112, a spindle 133 attached to the base plate 112, and at least one disc 134 attached to the spindle 133. The spindle 133 is adapted to rotate with respect to the base plate 112. The disc drive system 100 also includes an actuator assembly 120 attached to the base plate 112 which is adapted to rotate with respect to the base plate 112. A cover 114 is also included for attaching to the base plate 112. The cover 114 and the base plate 112 form a disc enclosure 210 which encloses the at least one disc 134, a portion of the spindle 133, and the actuator assembly 120. The disc drive system 100 also includes a mechanism for attenuating acoustical emissions produced by the spindle 133, the at least one disc 134, and the actuator assembly 120.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A disc drive comprising:
   a base plate;
   a spindle attached to the base plate;
   at least one disc attached to the spindle, the spindle adapted to rotate with respect to the base plate;
   a cover for attaching to the base plate, the cover and the base plate forming a disc enclosure which encloses the at least one disc and a portion of the spindle, the disc enclosure having an interior surface and an exterior surface wherein at least a portion of the interior surface consists of a plurality of anechoic pointed protrusions extending into an interior space of the disc enclosure.

2. The disc drive of claim 1 wherein the anechoic protrusions are formed integral to the cover.

3. The disc drive of claim 2 wherein the anechoic protrusions are formed integral to the cover are covered with a energy-absorbing material.

4. The disc drive of claim 1 wherein the anechoic protrusions are formed integral to the baseplate.

5. The disc drive of claim 4 wherein the anechoic protrusions formed integral to the base plate are covered with a energy-absorbing material.

6. The disc drive of claim 1 wherein the anechoic protrusions are formed integral to the base plate and to the cover.

7. The disc drive of claim 2 wherein the anechoic protrusions formed integral to the cover and the base plate are covered with a energy-absorbing material.

8. The disc drive of claim 1 wherein the anechoic protrusions are formed on a liner which is attached to at least a portion of the interior surface of the disc enclosure.

9. The disc drive of claim 8 wherein the liner is formed from an energy-absorbing material.

10. The disc drive of claim 8 wherein the liner is attached to the interior surface of the cover.

11. The disc drive of claim 8 wherein the liner is attached to the interior surface of the base plate.

12. The disc drive of claim 8 wherein the liner is further comprised of:
   a cover liner portion; and
   a base plate liner portion, wherein each of the cover liner portion and the base plate liner portion are attached to at least a portion of the interior surface of the disc enclosure.

13. The disc drive of claim 1 wherein the anechoic protrusions are formed to attenuate selected range of frequencies.

14. The disc drive of claim 13 wherein the anechoic protrusions are V-shaped rows.

15. The disc drive of claim 14 wherein the V-shaped rows are orientated in different directions on the interior surface of the disc enclosure.

16. The disc drive of claim 13 wherein the anechoic protrusions are spike-shaped.

17. A method for substantially reducing vibrations from a disc drive system having a base plate and a cover which form a disc enclosure having an interior surface and an exterior surface, the method comprising steps of:

(a) providing a plurality of anechoic pointed protrusions on the base plate corresponding to the interior surface of the disc enclosure; and (b) providing anechoic pointed protrusions on the cover corresponding to the interior surface of the disc enclosure.

18. The method of claim 17, wherein providing steps (a) and (b) further comprise steps of:

(a)(i) forming a liner member for the base plate of a disc drive;

(a)(ii) attaching the liner member to the base plate;

(b)(i) forming a Liner member for the cover of a disc drive; and (b)(ii) attaching the liner member to the cover.

19. The method of claim 17, wherein providing steps (a) and (b) further comprise steps of:

(a)(I) forming the base plate of a disc drive with anechoic protrusions therein;

(aj(ii) placing an energy-absorbing material on the base plate;

(b)(I) forming the cover of a disc drive with anechoic protrusions therein; and (b)(ii) placing an energy-absorbing material on the cover.

20. A disc drive system comprising:

a base plate;

a spindle attached to the base plate;

at least one disc attached to the spindle, the spindle adapted to rotate with respect to the base plate;

an actuator assembly attached to the base plate, the actuator assembly adapted to rotate with respect to the base plate;

a cover for attaching to the base plate, the cover and the base plate forming a disc enclosure which encloses the at least one disc, a portion of the spindle, and the actuator assembly; and means for attenuating acoustical emissions produced by the spindle, the at least one disc, and the actuator assembly.

* * * * *